(12) United States Patent
Waas et al.

(10) Patent No.: US 9,479,395 B2
(45) Date of Patent: *Oct. 25, 2016

(54) MODEL FRAMEWORK TO FACILITATE ROBUST PROGRAMMING OF DISTRIBUTED WORKFLOWS

(71) Applicant: EMC Corporation, Hopkinton, MA (US)

(72) Inventors: Florian Waas, San Francisco, CA (US); Christopher J. Pedrotti, San Jose, CA (US); Robbert VanRenesse, Ithaca, NY (US)

(73) Assignee: EMC Corporation, Hopkinton, MA (US)

( * ) Notice: Subject to any disclaimer, the term of this patent is extended or adjusted under 35 U.S.C. 154(b) by 260 days.

This patent is subject to a terminal disclaimer.

(21) Appl. No.: 14/245,998

(22) Filed: Apr. 4, 2014

(65) Prior Publication Data

US 2014/0304380 A1    Oct. 9, 2014

Related U.S. Application Data

(63) Continuation of application No. 13/250,507, filed on Sep. 30, 2011, now Pat. No. 8,732,282.

(51) Int. Cl.
*H04L 12/24* (2006.01)
*G06F 11/07* (2006.01)

(52) U.S. Cl.
CPC ............ *H04L 41/084* (2013.01); *G06F 11/07* (2013.01); *G06F 11/0709* (2013.01); *G06F 11/0757* (2013.01); *H04L 41/08* (2013.01); *H04L 41/0803* (2013.01); *H04L 41/0813* (2013.01); *H04L 41/0816* (2013.01)

(58) Field of Classification Search
CPC ........... G06F 11/0709; G06F 11/1464; G06F 17/30486; G06F 17/3089; G06F 9/5061; G06F 11/07; G06F 11/0757; H04L 29/06; H04L 29/12283; H04L 41/0622; H04L 41/0806; H04L 41/08; H04L 41/0803; H04L 41/0813; H04L 41/0816

See application file for complete search history.

(56) References Cited

U.S. PATENT DOCUMENTS

| | | | |
|---|---|---|---|
| 8,089,886 B1* | 1/2012 | Rahman | H04L 41/0622 370/242 |
| 8,732,282 B1* | 5/2014 | Waas | G06F 11/0709 709/220 |
| 2002/0147774 A1* | 10/2002 | Lisiecki | G06F 17/3089 709/203 |
| 2006/0190243 A1* | 8/2006 | Barkai | G06F 17/30486 704/8 |
| 2007/0073733 A1* | 3/2007 | Matthews | H04L 41/0806 |
| 2009/0165018 A1* | 6/2009 | Junqueira | G06F 9/5061 719/313 |
| 2009/0285126 A1* | 11/2009 | Lu | H04L 29/12283 370/255 |
| 2010/0037056 A1* | 2/2010 | Follis | G06F 11/1464 713/171 |
| 2011/0019550 A1* | 1/2011 | Bryers | H04L 29/06 370/235 |

* cited by examiner

*Primary Examiner* — Le H Luu
(74) *Attorney, Agent, or Firm* — Barry N. Young

(57) ABSTRACT

A method is disclosed. A finite state machine model for a single system workflow is replicated across a plurality of distributed nodes associated with a leader election protocol. A leader is determined amongst the plurality of distributed nodes to perform a next action of the finite state machine model based at least in part on the leader election protocol. One or more nodes amongst the plurality of distributed nodes are configured to submit a timeout ticket if the next action of the finite state machine model does not appear to have been performed by the leader within a prescribed time.

13 Claims, 10 Drawing Sheets

```
index="0"
for host in $HOSTS; do
  eval "slot_host$index=\$host"
  index=`expr $index + 1`
done read one command line at a time from standard input
while read cmd; do
  # infinite loop for this command until it gets run in a free job slot
  while true; do
    # loop through each job slot index
    for index in $index_list; do
      # get the PID for this job slot
      eval "pid=\$slot_pid$index"
      # either no PID yet or use SIGNULL to see if job slot has process running
      test $pid != x && kill -0 $pid 1> /dev/null 2>&1
      # if no process is running, start the job in the slot
      if test $? -ne 0; then
        # get the hostname for this slot
        eval "host=\$slot_host$index"
        # if verbose, print the job slot host and command
        if test $verbose = yes; then
          echo "$host: $cmd"
        fi
        # run the command on the remote host
        $distb_cmd $host -n "$cmd" &
        # record the pid of the remote shell command
        eval "slot_pid$index=$!"

.
              .
              .

# break out of enclosing for and while loops to start next command
        break 2
      fi
    done
    # after trying all hosts wait a second before trying again
    sleep 1
  done
done
```

FIG. 3

MODEL FRAMEWORK TO FACILITATE ROBUST PROGRAMMING OF DISTRIBUTED WORKFLOWS

CROSS REFERENCE TO OTHER APPLICATIONS

This application is a continuation of co-pending U.S. patent application Ser. No. 13/250,507, entitled MODEL FRAMEWORK TO FACILITATE ROBUST PROGRAMMING OF DISTRIBUTED WORKFLOWS filed Sep. 30, 2011 which is incorporated herein by reference for all purposes.

BACKGROUND OF THE INVENTION

Long-running workflows are common in a broad variety of applications, for example provisioning of servers or databases, systems management and data center management processes. Redundant hardware systems, or distributed systems, may protect a workflow from individual component failures. Distributed systems with physical and/or virtual separation provide high availability.

Programming workflows so they can be executed in a distributed environment and provide high availability requires expert knowledge in distributed systems engineering principles. For other systems that implement workflows for distributed systems, the distributed computing concepts are embedded deeply in software and not re-usable. The resulting software is difficult to maintain or extend.

There exists a need for a simple model framework that facilitates robust programming of distributed, highly available workflows.

BRIEF DESCRIPTION OF THE DRAWINGS

Various embodiments of the invention are disclosed in the following detailed description and the accompanying drawings.

FIG. 3 is an example of a prior solution to distributed workflows.

DETAILED DESCRIPTION

Figure 1:
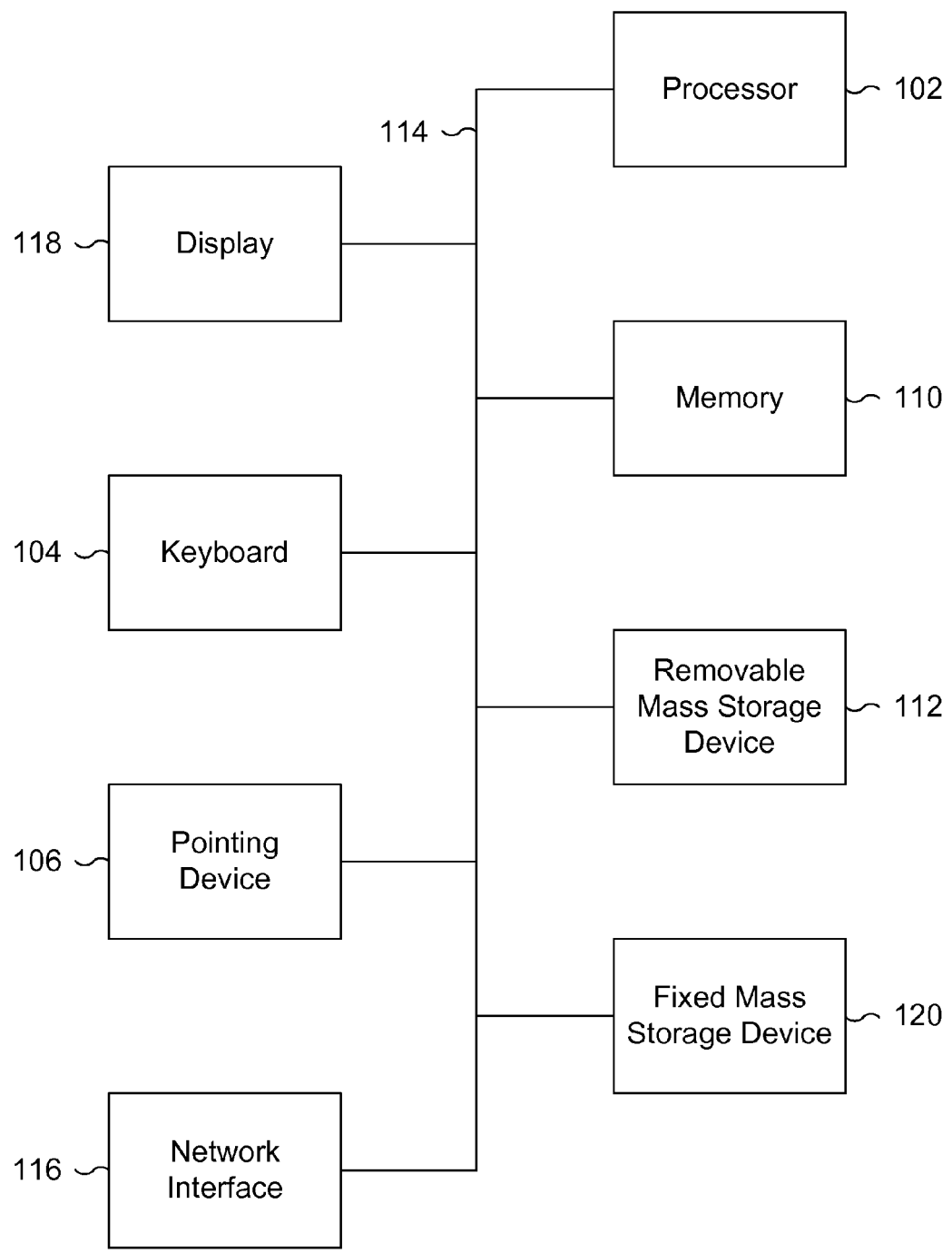
FIG. 1 is a functional diagram illustrating a programmed computer system for distributed workflows in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A simple model framework that facilitates robust programming of distributed, highly available workflows is disclosed. A workflow is defined throughout this specification as any series of steps or instructions. A distributed workflow is a workflow with more than one system executing the workflow. Distributed workflows are used in highly available environments where a system can pick up where a failed system left off Application scenarios include any long-running/highly available workflow: for example, data center management processes, systems management, or Extract-Transform-Load ("ETL") processes.

It is highly desirable to leverage redundant hardware systems to protect a workflow against individual component failures. Some prior systems implement their own failure detection, failover strategy, communication, and control flow mechanisms; the resulting software is almost never extensible as basic concepts of distributed computing are embedded too deeply in the software and not re-usable. There is no current simple programming model or framework that facilitates simple and robust programming of distributed, highly available workflows. A framework is disclosed that allows programmers to encode workflows without being: (1) aware of a distributed system on which it is executed, and (2) having knowledge of distributed systems theory, for example replication, consensus, and failure detection.

Distributed workflows and distributed systems in general are challenging to program, for example because of fault-tolerance issues and latency. An example of a prior solution may be script-based, for example a long script that checks each task to see if another system has completed that task. Distributed computing has become increasingly affordable, and the aforementioned problems are becoming more and more mainstream.

A more sophisticated solution is to incorporate a replication mechanism that propagates intermediate state or results to the different nodes of the distributed system. A number of replication mechanisms are known, including highly complex consensus protocols, such as Paxos. Incorporating a replication mechanism into a distributed workflow requires intimate knowledge of the replication mechanism and customizing the workflow to execute the replication correctly. As a result, the workflow becomes intricately integrated with the replication mechanism making it (1) difficult to program, (2) hard to maintain or extend. Re-usable modules may exist in academic papers and projects but are not practical.

The solution includes building the framework such that reading and writing state and transition are separated. Existing consensus protocols include both provisions for replication and leader election. Certain consensus protocols provide both these provisions in one package, for example, Paxos. Without loss of generality the disclosed system system can leverage separate mechanisms as well as combined ones like Paxos. Throughout this specification "consensus protocols" may refer either to integrated consensus protocols as well as the separate replication protocols and/or leader election protocols. A timeout ticket for any node of the distributed workflow, even for nodes who are not considered the leader by the consensus protocol, is used to solve mid-task failure. Versioning of tickets in the replication protocol regulates synchronous ticket submissions and consensus.

A distributed workflow engine is disclosed that provides a programming framework that provides developers with a simple and intuitive programming model: all functionality is encoded as and invoked through callbacks. Also provided is a distributed execution framework in which the workflow model is executed; failures are automatically detected and execution moves between redundant system components to ensure high availability, as needed. The invocation of callbacks is controlled by a distributed finite state machine that is synchronously replicated across the distributed system.

Using finite state machines allow a problem to be structured in simple compact modules and present an intuitive abstraction to developers. The programming model provides developers with a single system view, such that the application and/or developer is oblivious of the fact that it is executed in a distributed system. The generality of the programming model allows for any type of functionality to be executed: scripts, applications, etc. and does not require the programs to be written in any given programming language. Distributed workflows are common in large-scale computing, especially in data center and systems management where long-running processes are exposed to the risk of component failure, including hardware and software components.

FIG. 1 is a functional diagram illustrating a programmed computer system for distributed workflows in accordance with some embodiments. As shown, FIG. 1 provides a functional diagram of a general purpose computer system programmed to execute workflows in accordance with some embodiments. As will be apparent, other computer system architectures and configurations can be used to execute workflows. Computer system 100, which includes various subsystems as described below, includes at least one microprocessor subsystem (also referred to as a processor or a central processing unit (CPU)) 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118).

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions (e.g., programmed instructions). For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110 (e.g., RAM) as virtual memory.

In addition to providing processor 102 access to storage subsystems, bus 114 can be used to provide access other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions), from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing.

Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
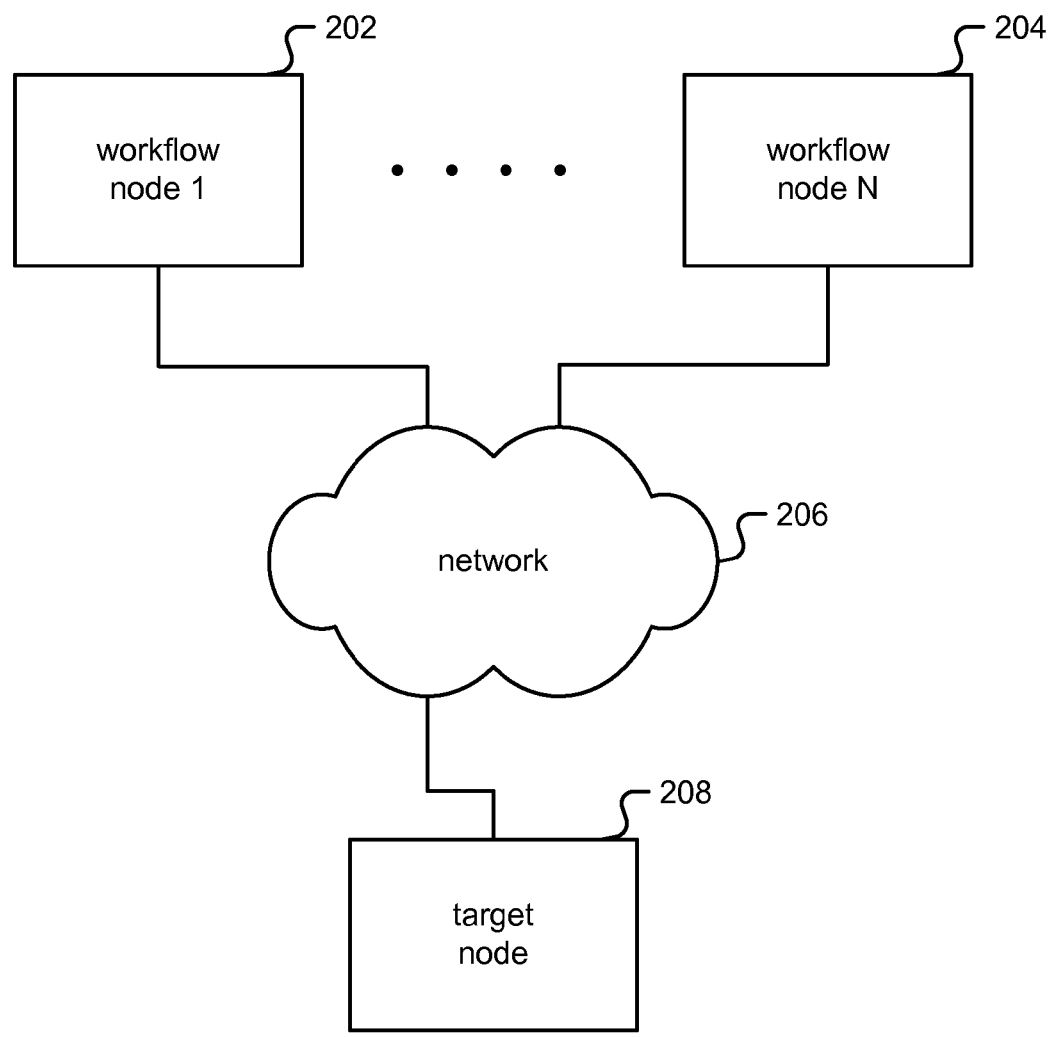
FIG. 2 is a block diagram illustrating an embodiment of an environment for a distributed workflow.

FIG. 2 is a block diagram illustrating an embodiment of an environment for a distributed workflow. In the example shown, workflow node 1 (202) may for example be a computer system as described in FIG. 1. There are a plurality of workflow nodes/systems, here depicted up to workflow node N (204). Workflow nodes are coupled via network 206; throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. The network 206 is also coupled to target node 208 where tasks are targeted towards, for example a database or a server. The target node 208 here is shown separate from a workflow node; in some embodiments the target node 208 may be within the same system as a workflow node 202.

FIG. 3 is an example of a prior solution to distributed workflows. The prior solution uses a bulky script, having to query and resolve whether specific subtasks have been completed, in some cases recording which node, and retaining in some fashion which subtasks are remaining to be completed. The script method is inefficient and complex to program, difficult to debug, and poorly suited for re-usable code.

Figure 4A:
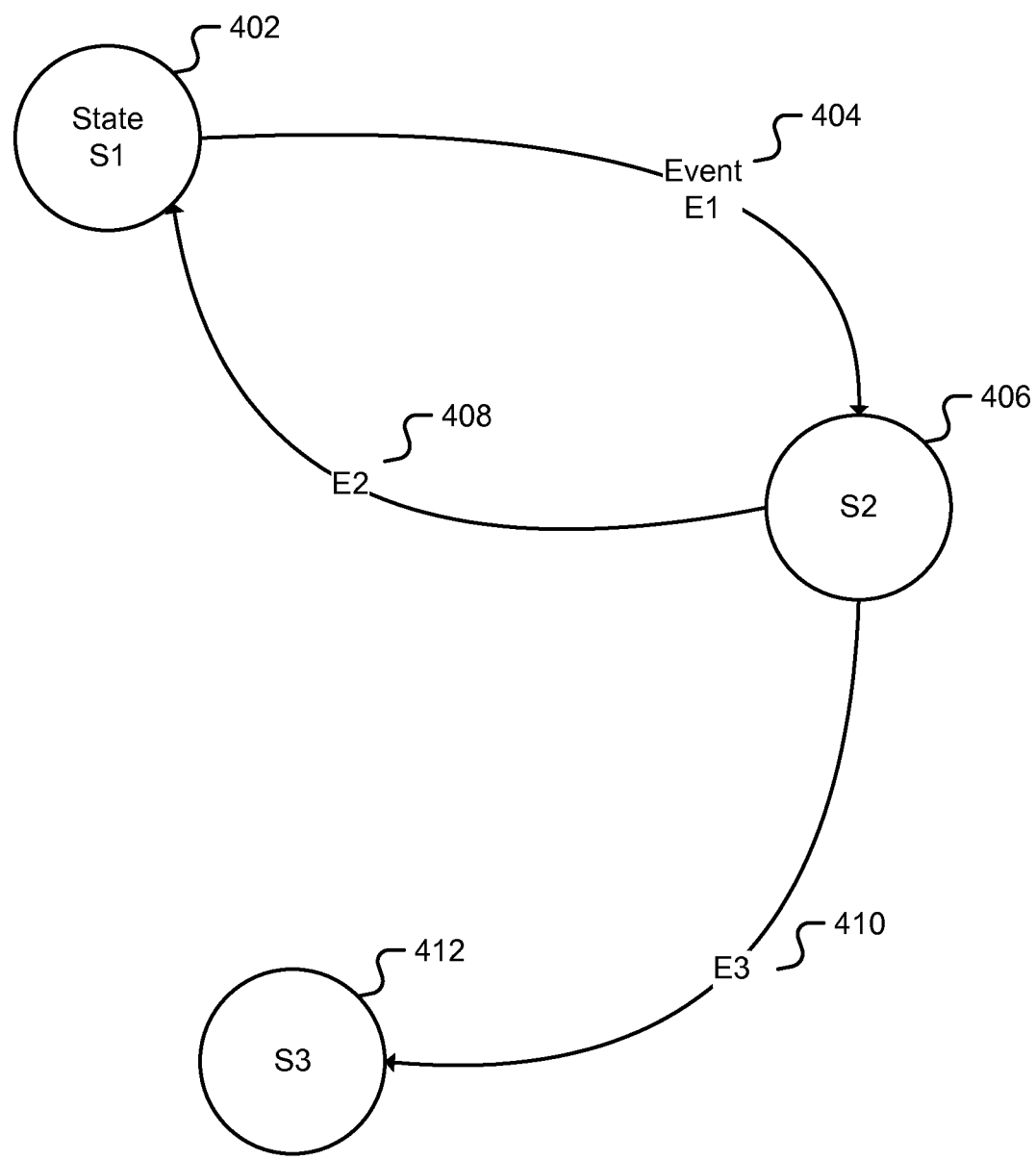
FIG. 4A is an example of a finite state machine model for distributed workflows.

FIG. 4A is an example of a finite state machine model for distributed workflows. Instead of using the bulky script in FIG. 3, a workflow developer could describe the workflow in terms of a finite state machine as shown in FIG. 4A. In some embodiments a workflow developer can use a graphical programming language to describe the workflow. The finite state machine model is a single system workflow, meaning that the workflow developer can develop the model without requiring the knowledge of any distributed computing principles, the number or capacity of workflow nodes, or even without knowing that the workflow will be distributed at all. Furthermore, the finite state machine model may be tested on a single system for development purposes, for example on a developer's laptop. These advantages are not available with the prior solution of a bulky script of FIG. 3.

FIG. 4A starts out in state S1 (402), which stays in S1 until trigger condition/event E1 (404) occurs transitioning the system to state S2 (406). A second trigger E2 (408) will transition the system back to state S1 (402) while a trigger E3 (410) in state S2 (406) will transition the system to state S3 (412). One example would be from server provisioning: An example of state S1 is modifying a boot image for a server and a state S2 finding additional network resources/parameters. Trigger E1 is changing a network parameter and trigger E2 is requiring more boot image modification. State S3 is an audit and trigger E3 is completing the resource provisioning where no more network resources/parameters need to be changed on the boot image.

A concern with FIG. 4A when distributed across nodes is that a leader node performing the action of a given state may fail, leaving the entire environment hanging.

Figure 4B:
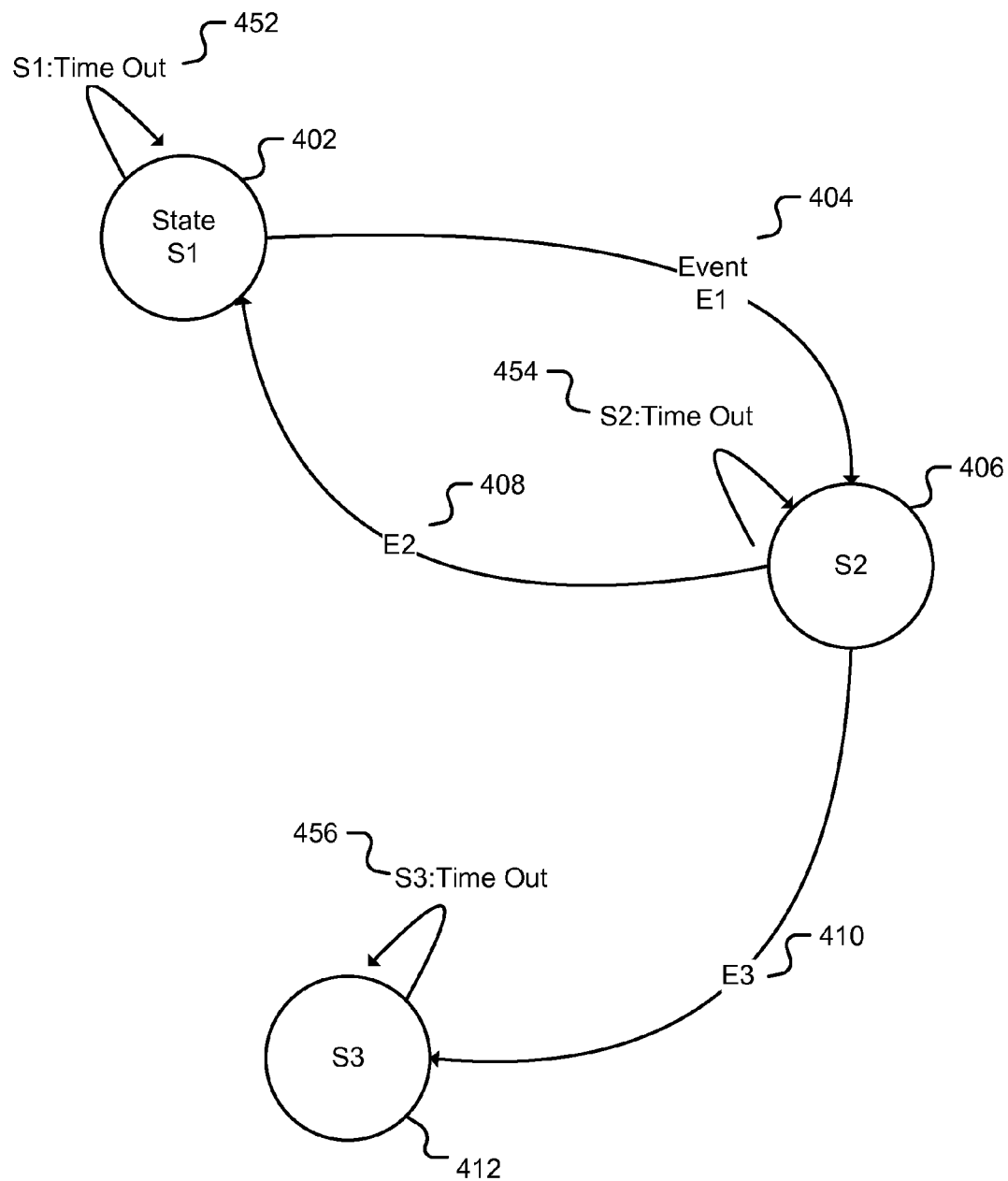
FIG. 4B is an example of a finite state machine model for distributed workflows, modified with timeout triggers.

FIG. 4B is an example of a finite state machine model for distributed workflows, modified with timeout triggers. The model may be input from a developer as shown in FIG. 4A and automatically configured to add trigger condition/event "S1:Time Out" (452), "S2:Time Out" (454), and "S3: Time Out" (456). Each of the conditions 452, 454 and 456 are triggered on timing out in the state. For a distributed workflow, these particular triggers may be observed and recorded from any of the nodes instead of the "leader" node of a consensus protocol as explained later.

Figure 5A:
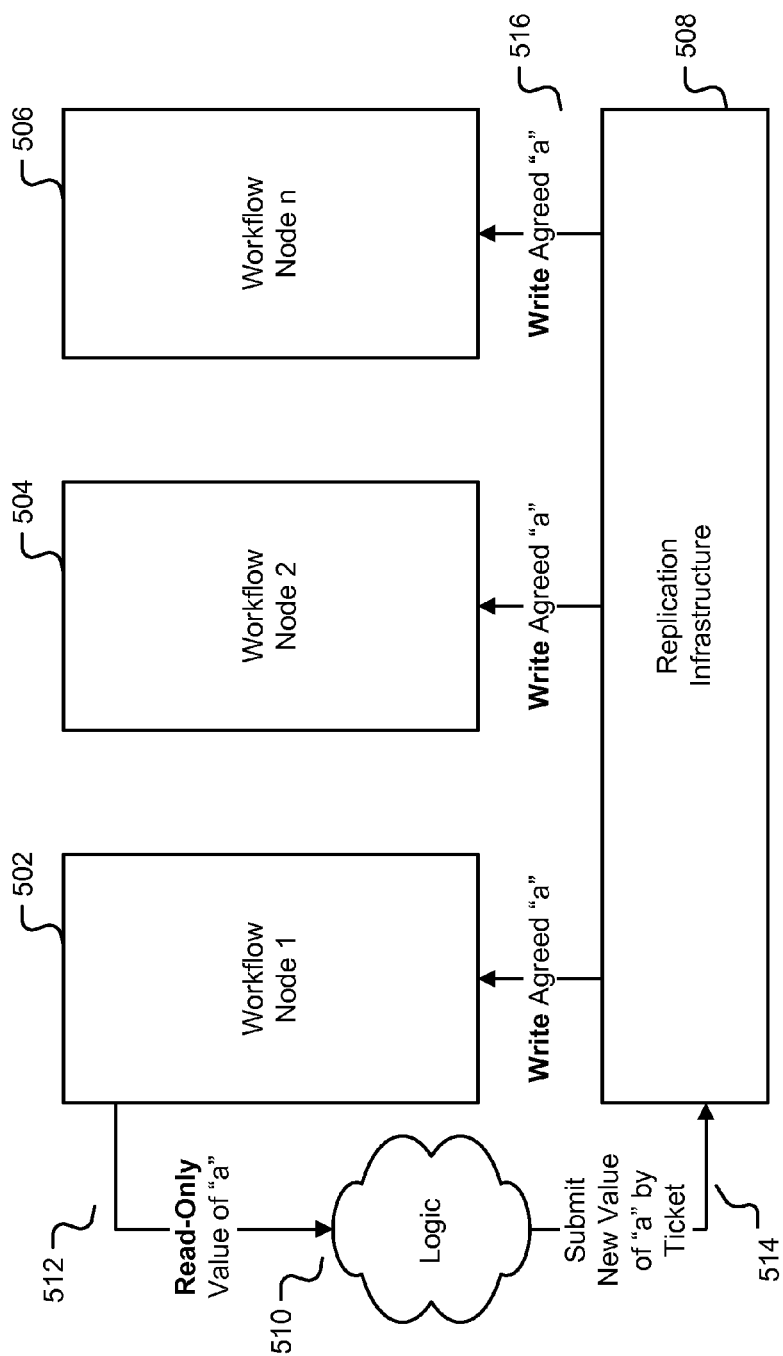
FIG. 5A is an example of a conceptual model of the integration of a replication/consensus algorithm with distributed workflow nodes.

FIG. 5A is an example of a conceptual model of the integration of a replication/consensus algorithm with distributed workflow nodes. Workflow nodes 1 (502), 2 (504), until n (506) each are coupled to replication infrastructure 508. In some embodiments, the replication infrastructure 508 is a consensus infrastructure 508 with provisions for leader election. In other embodiments, the replication infrastructure 508 uses provisions for leader election from a separate leader election protocol. Workflow nodes may be for example within a datacenter rack, separated by racks at a datacenter, separated by datacenters, or further separated by geographic diversity. One goal is to tolerate total outages of an entire datacenter rack, an entire datacenter, or an entire city or other geographic boundary. An example of a full-featured consensus protocol for 508 is Paxos. Any lightweight or full-featured replication and/or consensus protocol may be used in 508.

In sequential logic, a simple assignment such as "a←a+1" is determinate and assigns a value to state "a" equal to the previous value of "a" plus one. For a distributed environment, however, "a←a+1" is indeterminate because the assignment and/or the value of "a" may change around the same time another node is performing the same assignment.

A simple solution is to separate read and write functionality, as shown in FIG. 5A. Logic 510 represents, for example, the assignment above, "a←a+1". In a first step 512, a workflow node 502 begins the assignment by a read-only of the value of "a". After passing through the logic 510, the node 502 submits a new value for "a" to the replication protocol 508 in a second step 514. In some embodiments, the submission is via a ticket.

Replication infrastructure 508 receives the ticket and accepts or rejects the ticket based on the replication/consensus protocol. The replication/consensus protocol does not necessarily understand "a", logic 510 or even the context with which workflow node 502 has submitted the ticket, and "a" is just a token within the ticket. After coming to consensus in a third step 516 the agreed-upon value of "a" is written to all nodes.

A synchronous measure to address network and node latency is the introduction of versioning as a portion of the ticket. A simple example of versioning for a given node is recording as the version the number of decisions that have been made that the node has been aware of. A simple way to introduce version control is to incorporate the version number with the ticket, for example a ticket as tuple ("a←1", VSN:10), or ("time/out", VSN:15).

Figure 5B:
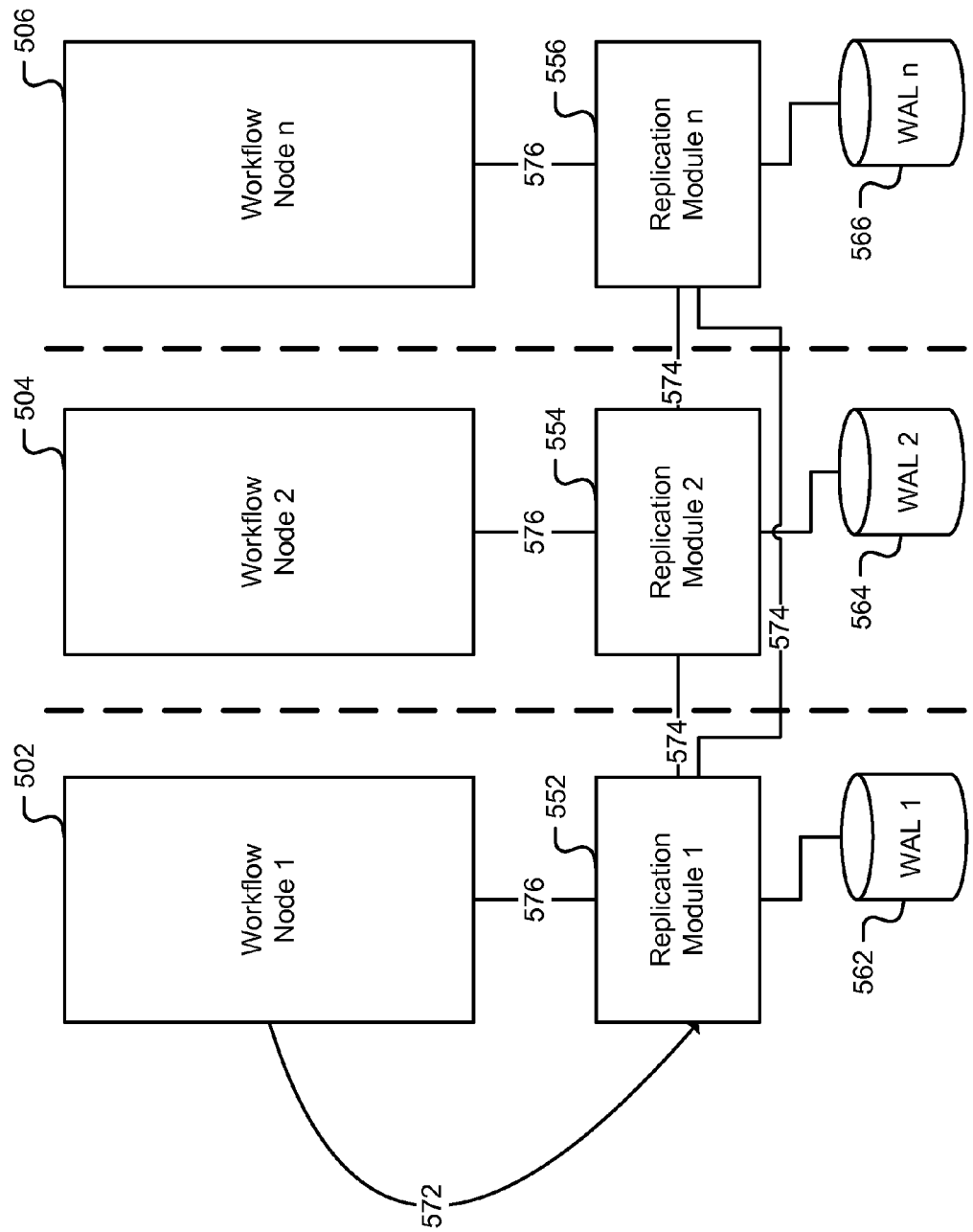
FIG. 5B is an example of a practical model of the integration of a replication/consensus algorithm with distributed workflow nodes.

FIG. 5B is an example of a practical model of the integration of a replication/consensus algorithm with distributed workflow nodes. This example is based on the conceptual model shown in FIG. 5A, with the dashed lines indicating the separation between workflow nodes 502, 504 and 506. The replication infrastructure 508 is a "plug-in" module that logically is associated with each node; replication module 1 (552) with workflow node 1 (502), replication module 2 (554) with workflow node 2 (504), replication module n (556) with workflow node n (506), etc. Each of the workflow nodes 502-506 have a local copy of the finite state machine model of the workflow, for example shown in FIG. 4B. The replication modules 552-556 are fully connected; each module is coupled to all the other modules, directly or indirectly through a network. A write-ahead log ("WAL") is associated with each node; WAL 1 (562) with replication module 1 (552) and/or workflow node 1 (502), WAL 2 (564) with replication module 2 (554) and/or workflow node 2 (504), WAL n (566) with replication module n (556) and/or workflow node n (506), etc. The WAL records decisions and actions before committing the actual action in the event of a node outage, and may be implemented using, for example, a standard database.

A distributed workflow integrated with replication modules 552-556 begins with one of the nodes 502-506 termed the "leader". At any one time there is at most one leader which will execute the action(s) described by, for example state S1 (402) in FIG. 4B. When event E1 404 occurs, during a first step 572 a ticket is submitted by leader, here shown as workflow node 502, to the replication module 552. Again, read and write are separated to provide fault-tolerance. The ticket may be, for example, "(E1, VSN:3, *)" describing the trigger/event itself, an associated ticket version, and "*" to describe that the ticket was submitted by the leader. At any time the workflow nodes 502-506 may submit a timeout ticket, for example ("Time/Out, VSN:2)" indicating that the associated node has timed out without seeing any response from the leader and an associated ticket version. A timeout ticket from non-leaders or the leader node reduces a leader node outage impacting the distributed workflow. The timeout can be based on a constant timeout threshold, a variable timeout threshold, or a dynamic timeout threshold.

The replication modules 552-556 determine in a second step 552 whether to accept or reject the ticket(s). The replication/consensus protocol does not necessarily need to understand the finite state machine in FIG. 4B, the versioning system, or the timeout. The replication/consensus protocol may treat them all as elements of the ticket. For example, the replication/consensus protocol decides to accept the leaders ticket ("E1, VSN:3, *)", which in a third step 576 is submitted as confirming event E1 to all state machines tracked in nodes 502-506, and along with the confirmation indicating which node 502-506 is the next action leader. By replicating the state over a distributed number of servers using the replication/consensus protocol, the result is a distributed highly available workflow with simple and robust programming for the framework developer. In the event a node fails, the distributed workflow system will synchronously replicate the finite state machine model to a new candidate node.

Figure 6:
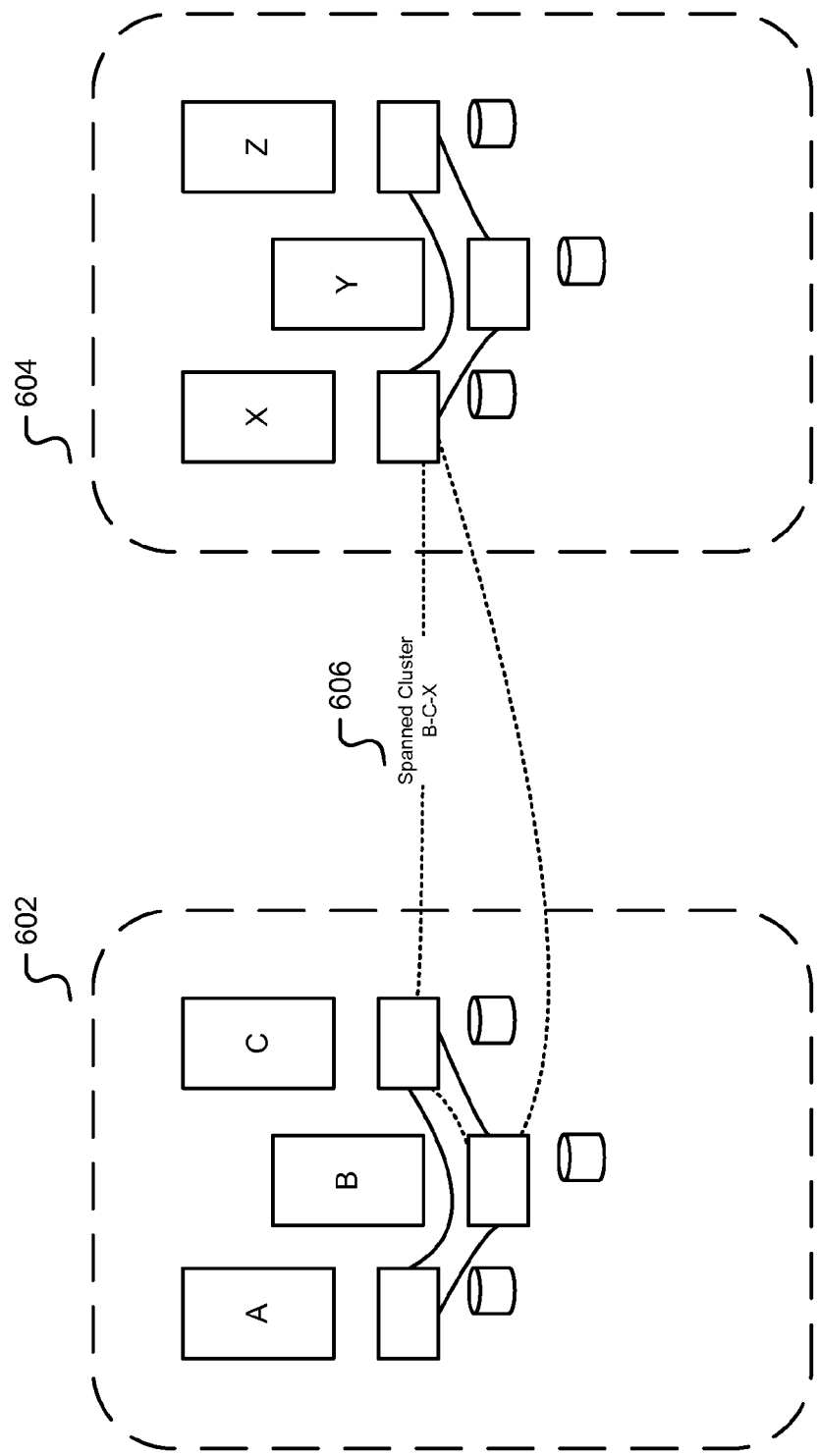
FIG. 6 is an example of multiple distributed workflows.

FIG. 6 is an example of multiple distributed workflows. The clusters A-B-C 602 and X-Y-Z 604 both may run separate distributed workflow simultaneously, similar to that shown in FIG. 5B. In addition, nodes from both clusters 602 and 604 may also work on a third distributed workflow spanning the clusters, shown as spanned cluster 606 involving nodes B-C-X. Thus multiple workflows will have a conceptual separation into, for example "channels", but can use the same nodes.

Figure 7:
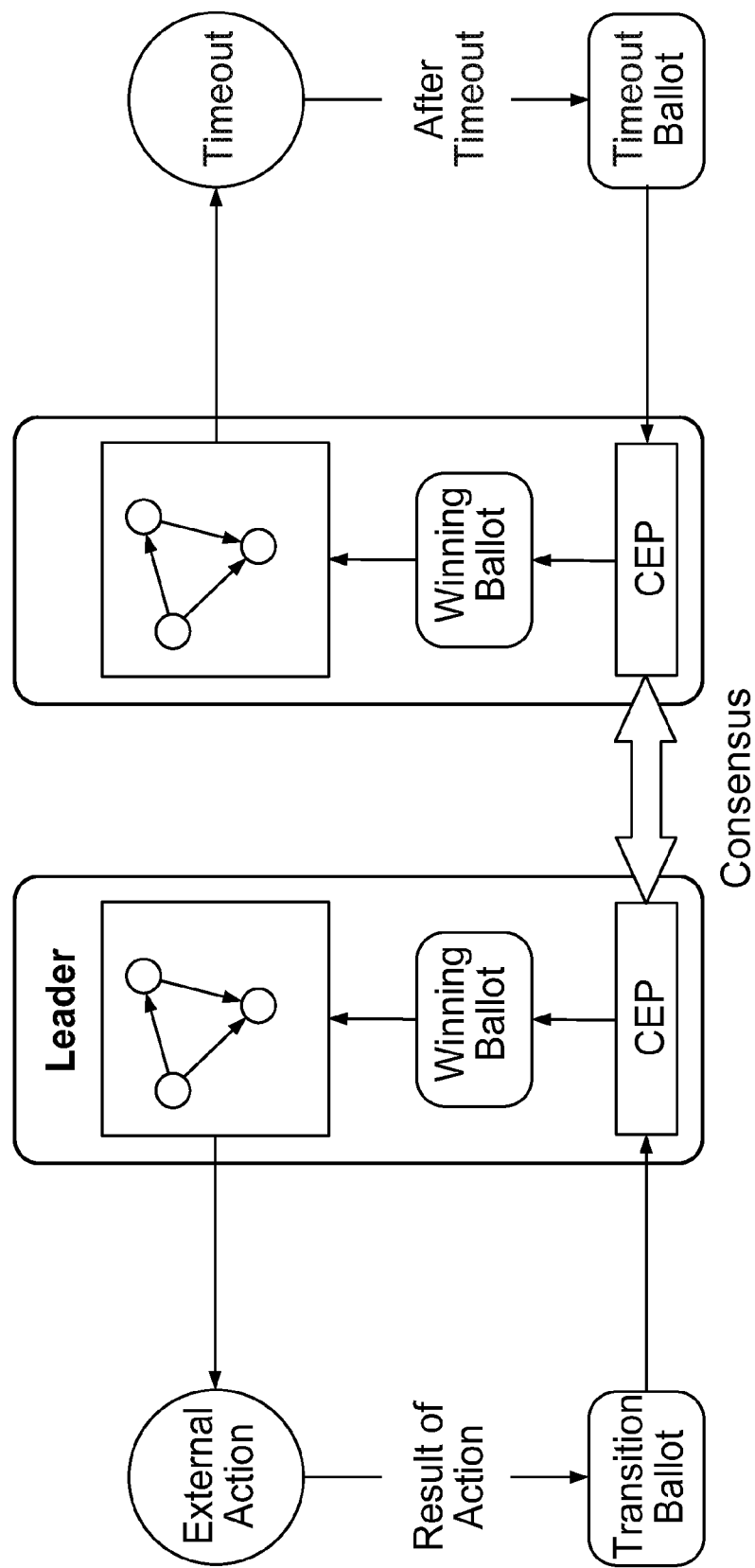
FIG. 7 is an example of a distributed state machine replicated by two conferences.

FIG. 7 is an example of a distributed state machine replicated by two conferences. The leader executes external action and votes with result, while another replica spawns a timeout and after expiration votes for timeout. State servers that are not leader, i.e., the ones that do not perform the actual external action, spawn a timeout process that will simply submit a timeout ticket after a given period. If the distributed state machine ("DSM") contains an explicit timeout transition from the current state, this transition will be executed and the appropriate new state is reached. Any ticket may carry a parameter, in addition to the label of the edge. Leaders may be assigned in round-robin fashion, which may particularly be useful for testing purposes. Leaders may be also be assigned based on any leader election mechanism that could be encoded in the underlying consensus protocol.

In some embodiments, timeout edges may be parameterized. There may be different timeouts depending on what state in the state machine is actively processed. If the current state does not explicitly define a timeout edge, the DSM is transitioned into an error state. All DSMs must provide the standard error state callback that typically contains clean-up steps. A DSM may manipulate any number of other components by submitting tickets to their respective channels. A DSM may invoke additional external processes, for example, management utilities for a database or server.

Figure 8:
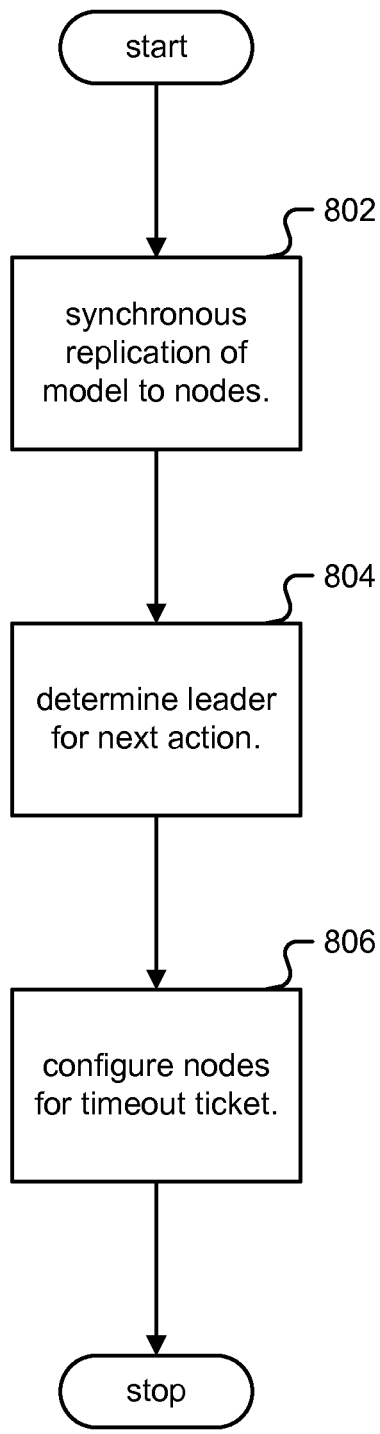
FIG. 8 is a flowchart illustrating an example of distributed workflow execution.

FIG. 8 is a flowchart illustrating an example of distributed workflow execution. In step 802, finite state machine model is synchronously replicated for a single system workflow across a plurality of distributed nodes associated with a consensus protocol. Synchronous replication includes using ticket versioning. The consensus protocol is not required to interpret the single system workflow.

In step 804, a leader is determined amongst the plurality of distributed nodes to perform a next action of the finite state machine model based at least in part on the consensus protocol.

In step 806, one or more nodes amongst the plurality of distributed nodes are configured to submit a timeout ticket if the next action of the finite state machine model does not appear to have been performed by the leader within a prescribed time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a single system workflow;
determining a finite state machine model for the single system workflow; and
preparing the finite state machine model for replication across a plurality of distributed nodes associated with a leader election protocol;
wherein a leader is determined amongst the plurality of distributed nodes to perform a next action of the finite state machine model based at least in part on the leader election protocol; and
wherein one or more nodes amongst the plurality of distributed nodes is configured to submit a timeout ticket if the next action of the finite state machine model does not appear to have been performed by the leader within a prescribed time.

2. The method of claim 1, wherein the single system workflow is received from a developer unaware the single system workflow is to be executed in a distributed system.

3. The method of claim 1, wherein the single system workflow is in a graphical programming language.

4. The method of claim 1, wherein the single system workflow is in a script.

5. The method of claim 1, wherein the single system workflow is received from a developer who has tested the single system workflow on a single system.

6. The method of claim 1, wherein the single system workflow is received from a developer unaware of any distributed computing principles.

7. The method of claim 1, wherein the single system workflow is received from a developer unaware of how many distributed nodes there are within the plurality of distributed nodes.

8. The method of claim 1, wherein the single system workflow is received from a developer unaware of distributed node capacity for one or more of the plurality of distributed nodes.

9. The method of claim 1, wherein the leader election protocol is a consensus protocol.

10. The method of claim 1, wherein a workflow is a process comprising a series of steps.

11. The method of claim 1, wherein the single system workflow comprises one or more of the following: provisioning of a database and an Extract Transform and Load process.

12. A system, comprising:
a processor; and
a memory coupled with the processor, wherein the memory is configured to provide the processor with instructions which when executed cause the processor to:
receive a single system workflow;
determine a finite state machine model for the single system workflow; and
prepare the finite state machine model for replication across a plurality of distributed nodes associated with a leader election protocol;
wherein a leader is determined amongst the plurality of distributed nodes to perform a next action of the finite state machine model based at least in part on the leader election protocol; and
wherein one or more nodes amongst the plurality of distributed nodes is configured to submit a timeout ticket if the next action of the finite state machine model does not appear to have been performed by the leader within a prescribed time.

13. A computer program product, the computer program product being embodied in a non-transitory computer readable storage medium and comprising computer instructions for:
receiving a single system workflow;
determining a finite state machine model for the single system workflow; and
preparing the finite state machine model for replication across a plurality of distributed nodes associated with a leader election protocol;
wherein a leader is determined amongst the plurality of distributed nodes to perform a next action of the finite state machine model based at least in part on the leader election protocol; and
wherein one or more nodes amongst the plurality of distributed nodes is configured to submit a timeout ticket if the next action of the finite state machine model does not appear to have been performed by the leader within a prescribed time.

* * * * *